KEYED AUTOMATIC GAIN CONTROL
Filed Dec. 29, 1948
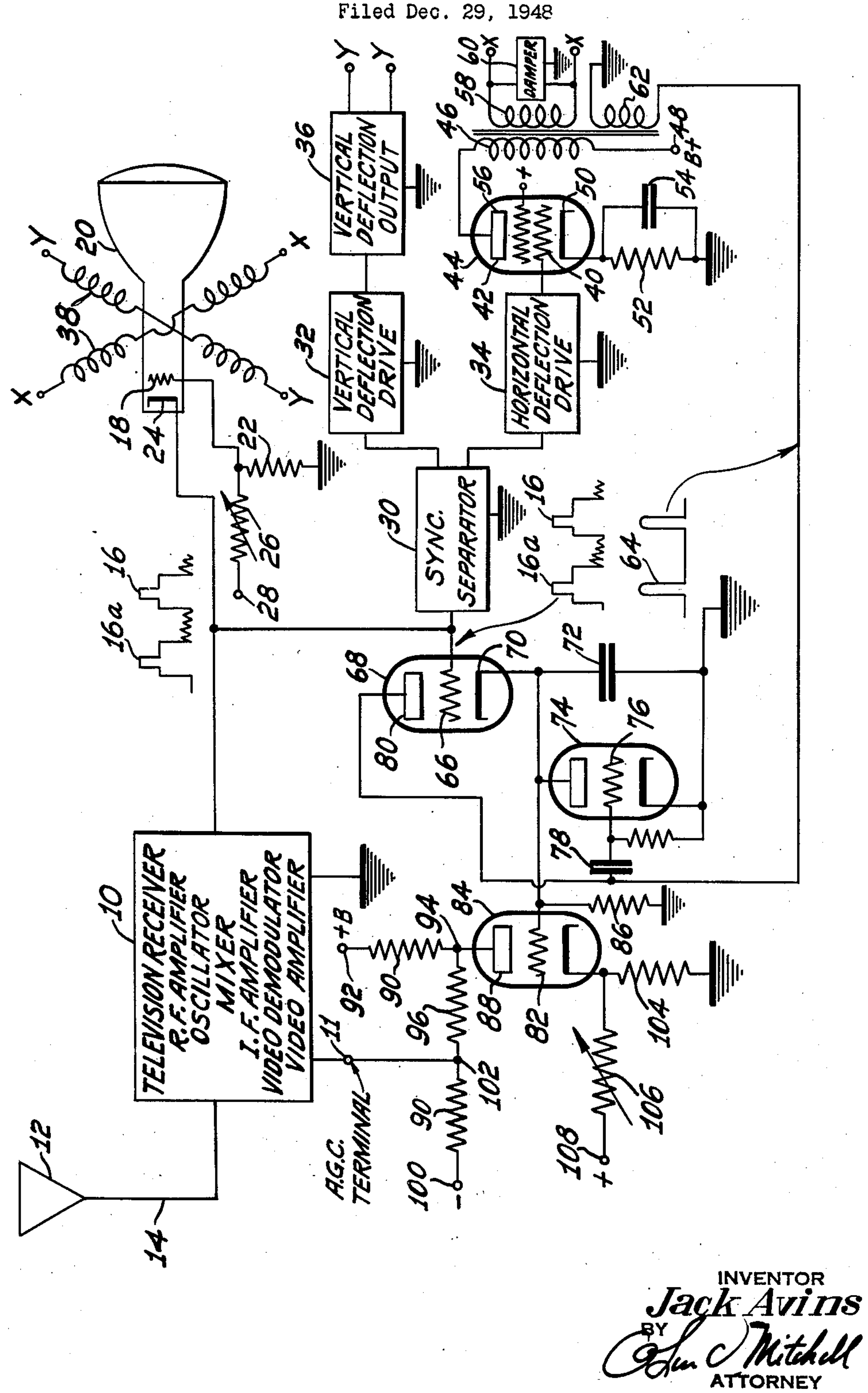
INVENTOR
Jack Avins
BY
[signature]
ATTORNEY Patented Sept. 2, 1952 2,609,443

UNITED STATES PATENT OFFICE 2,609,443

KEYED AUTOMATIC GAIN CONTROL

Jack Avins, Staten Island, N. Y., assignor to Radio Corporation of America, a corporation of Delaware Application December 29, 1948, Serial No. 67,993

1 Claim. (Cl. 178—7.3)

The present invention relates to a keyed form of signal amplitude responsive system for use in electrical circuits, and it is concerned more directly with a keyed signal amplitude responsive system having extraordinarily rapid response to both increase and decrease in applied signal amplitude.

The present invention deals more particularly, although not necessarily limited thereto, with a novel form of fast-acting automatic gain control system finding ready application to television receivers. Whereas, in the prior art, there have been numerous forms of keyed automatic gain control circuits, there has usually appeared some limitation as to the speed with which the circuit responds to both increases and decreases of signal strengths. This limitation generally comes about by way of the conventional time constant networks employed in the circuits associated with development of the automatic gain control potential. In television systems particularly, the speed of circuit response has been at times restricted to a value which requires at least several line scansion intervals in the television system in which to fully correct for any change in the received signal strength.

The present invention provides a signal amplitude detection system which responds so rapidly to changes in applied signal that necessary corrections in television receiver gain due to changes in signal strength may be accomplished, with ease, before each successive line of the reproduced television image.

The high speed signal amplitude responsive system of the present invention in one of its exemplary embodiments contemplates the use of a first and second electronic discharge tube connected in series across a source of keying pulses. Keying pulses are also applied to the grid of the second discharge tube so that in effect the second discharge tube acts as a keyed cathode resistance for the first discharge tube. A capacitor is in turn placed in shunt with the second discharge tube. The signal whose amplitude is to be sampled is then applied to the grid of the first discharge tube such that during the intervals in which the system is keyed, the shunt capacitor will, through well-known cathode follower action, charge to a value substantially equal to the instantaneous grid voltage applied to the first discharge tube. Since the discharge tubes are normally non-conductive and rendered conductive only during the intervals corresponding to the keying pulses, the voltage developed across the capacitor resistance will vary only in response to changes in applied signal amplitude.

It is commonly known that automatic gain control circuits for use in television receiving equipment differ greatly from the more frequently encountered automatic gain control circuit embodied in receivers for sound broadcast signals. In the instance of the usual broadcast receiver designed for the reception of amplitude modulated carriers, it is deemed adequate that the automatic gain control potential be produced by electrical information gleaned from the average carrier intensity of the received radio signal. Clearly, such an automatic gain control circuit would not be satisfactory for controlling the gain of television receiver video channels as the average signal strength of the radio frequency carrier is a function of the average image or picture brilliance sometimes referred to as "background level." As is well-known to those skilled in the art to which this invention appertains, development of an automatic gain control voltage in accordance with the average signal strength of the received television radio carrier would cause the gain to be changed not only in accordance with the signal intensity variations of the received radio carrier due to undesirable fading or other atmospherical phenomena, but also in accordance with average picture brilliance of the image being transmitted.

Radio transmitted "negative modulated" television signals normally include blanking pulses or black level information which data is transmitted between each image line in combination with the line synchronizing pulse. This line sync pulse is most commonly superimposed upon the black level signal and these data are transmitted at some respectively predetermined constant but different carrier levels. In common television practice the sync pulse is transmitted at maximum carrier intensity, or 100 per cent carrier amplitude, while the black level or blanking pulse is transmitted at approximately 75 per cent of the full carrier amplitude. The blanking impulse or black level signal in accordance with R. M. A. television synchronizing waveform standards is of the order of 16 to 18 per cent of a line interval with the sync impulse having a period of approximately 8 per cent of a line interval. Sync impulses when superimposed upon the blanking or black level signals are stationed between the extremities of the blanking interval so as to form what is commonly termed the "front porch" and "back porch" of the pedestal-like structure formed by the combined sync signal and blanking impulse. The front porch interval is approximately 2 per cent of the line interval and represents the time between the leading edge of each black level signal and the leading edge of the line sync pulse, whereas, the back porch interval of approximately 6 percent of a line interval, is equivalent to the time interval between the end of the line sync pulse and the termination of the black level or blankout signal.

The amplitude of the radio frequency carrier as previously brought out is held constant during the transmission of all blanking and sync impulse information. During the transmission of image intelligence of the television signal, that is, during each line interval between successive blanking signals, the average amplitude of the transmitted radio frequency carrier is a function of the average light contained in the television image. Accordingly, if the reproduced image is to be predominantly dark, the average carrier amplitude will necessarily be greater than would be the case if the background level of the image were considerably lighter, such action of course is true only in the negative system of transmission wherein white picture information is transmitted at a lower carrier level than black level information. It is expedient, in order that the control of the gain of the receiver be in accordance with the proper aspects of the carrier, that the automatic gain control potential be developed such that its magnitude is a function of the intensity of the received carrier of the television signal during the blanking or sync intervals only, and as hereinbefore brought out, not during the transmission of the picture or line information.

Since the blanking, and more particularly the sync signals, are transmitted at greater radio frequency intensity than image line information, it has been the general practice in television receivers to utilize some form of a peak rectifier which responds to those peak pulses of energy represented by the blanking and synchronizing signals during the synchronizing intervals. An automatic gain control system of this type is satisfactory to a degree so long as extraneous signals are not received in sufficient intensity to cause the peak rectifier to respond to this undesirable signal energy. In such arrangement if there is considerable noise picked up at the receiver the noise signal, as such, especially if it has an amplitude which produces total carrier signal excursions in excess of the received carrier during the synchronizing intervals, will cause the peak detector to produce an abnormal increase in rectifier energy and therefore produce abnormal increase in automatic gain control potential which results in a generally undesirable reduction of the receiver sensitivity as a result of such noise. This, of course, interferes with the proper operation of the receiver and produces fluctuations of the reproduced image brightness with possible periods following the noise bursts during which inadequate synchronizing information is applied to the synchronizing circuits due to an abnormally high reduction in receiver gain. This latter effect may tend to produce "tearing out" or other destructive "disturbances" in the reproduced image. Furthermore, in such systems the automatic gain control potential that is developed by each successive sync or blanking signal is generally stored on a condenser or applied to a circuit having a time constant where as pointed out hereinabove delay action may obtain such that the automatic gain control potential is, for all practical purposes, maintained constant throughout one or more succeeding field intervals regardless of changes in signal strength. Due to the operation of the peak detector and the presence of this time delay circuit, such a circuit may also respond rapidly to high intensity noise pulses but not allow the receiver to recover as quickly from the effects of noise as it responded to the noise with the result that proper gain of the video channel is not re-established until after an interval corresponding to many image lines has elapsed.

In the presence of considerable noise, such automatic gain control circuits are not, therefore, entirely satisfactory since they respond to noise pulses as well as sync impulses and in so doing are slow to recover from sporadic increased energy effects represented by the additional noise.

If the high-speed signal amplitude responsive system of the present invention is keyed by a signal held in synchronism with the line scansion function of the television receiver and the received television signal is applied for sampling by the system so that the voltage developed across the shunt capacitor may be used as an AGC control voltage, the above related disadvantages of prior art AGC systems may be overcome.

It is therefore a purpose of the present invention to provide a keyed electronic circuit having extraordinarily high-operational speed which will develop a voltage in accordance with the amplitude of an applied signal during intervals corresponding to keyed state of the circuit.

It is another purpose of the present invention to provide an improved automatic gain control circuit simple in operation for embodiment in radio receivers adapted to translate standard types of television signals.

Another purpose of the present invention resides in the provision of an improved automatic gain control circuit for a television receiver, wherein the circuit is rendered unresponsive to received signals during intervals between successive blanking periods.

It is another purpose of the present invention to provide a simple, economical and high speed system for radio receiver keyed automatic gain control operation which requires a minimum of apparatus and exhibits substantially the same high speed of response to decreases and increases in received signal strength.

The novel features which are believed to be characteristic of the present invention are set forth in the appended claims. The invention itself, however, both to its organization and method of operation, will be best understood from the teachings of the following description especially when taken in connection with the accompanying drawings wherein:

The figure is one embodiment of the present invention as applied to a conventional television receiving circuit.

Referring now to the figure, there is indicated in block form 10 certain well-known components of a conventional television receiver including an R. F. amplifier, an oscillator, a first detector or mixer, an intermediate frequency amplifier, a video demodulator, and a D. C.-connected video amplifier. Examples of typical arrangements applicable to the functions depicted by block 10 as well as other block representations in the drawings hereinafter to be described are given in an article entitled "Television Receivers" by Antony Wright appearing in the March 1947 issue of RCA Review. The signals are picked up by antenna 12 and through the medium of transmission line 14 are applied to the input of the receiver as shown. After the received signal has been demodulated it is amplified by the video amplifier, both the second detector and picture D. C. component being retained. The demodulated video signal 16 is then applied to the cathode 24 of an image reproducing cathode ray tube 20. A resistor 22 is connected between the grid 18 and ground potential such that the rheostat 26 connected with a source of negative potential 28, may be varied to provide a conventional brightness control action on the reproduced image.

The video signal 16 is also applied to the input of the synchronizing signal separator 30 which effects separation of the vertical and synchronizing pulses and respectively applies them to the vertical and horizontal deflection drive generators 32 and 34. The output of the vertical deflection drive generator is then conventionally applied to the vertical deflection output stage 36 having output terminals Y—Y for connection with the vertical deflection winding Y—Y of the deflection yoke 38 associated with the reproducing tube 20. Accordingly, the output of horizontal deflection drive generator 34 is applied to the control grid 40 of the horizontal deflection output tube 42. The anode 44 of the vacuum tube 42 is supplied with biasing potential through the output transformer winding 46 from a B+' power supply terminal 48. The cathode 50 of the horizontal output tube 42 is connected with ground through cathode biasing resistor 52 in turn shunted by by-pass capacitor 54. The screen grid 56 is indicated as being conventionally supplied with a suitable positive potential. The secondary 58 of the horizontal output transformer is as adapted for connection at X—X with the terminals X—X of the horizontal deflection winding of the yoke 38. A suitable damping circuit 60 is placed across the yoke winding to insure proper waveform of the current variations in the horizontal deflection winding X—X. An auxiliary secondary winding 62 with one terminal connected with ground is also shown on the horizontal output transformer to provide a source of positively extending pulses such as shown at 64. During proper synchronous operation of the television receiver, these pulses corresponding to the return trace of the horizontal deflection cycle will also be in synchronism with the received synchronizing pulses 16A of the signal 16.

According to the present invention, the signal 16 is also applied to the grid 66 of the vacuum tube 68 which has its cathode 70 connected with ground potential through capacitor 72. This capacitor 72 is shunted by vacuum tube 74 having its control elecrode 76 supplied with the positively extending keying pulses 64 through the coupling medium of capacitor 78. It will be noticed that these pulses 64 are also applied to the anode 80 of vacuum tube 68.

In the operation of the present invention, the pulses 64 are of sufficient amplitude to cause the normally non-conductive discharge tubes 68 and 74 to become conductive during the blanking period. It will be seen that during the conduction of both vacuum tubes 68 and 74 that the vacuum tube 74 effectively functions as a cathode resistance for the vacuum tube 68. As will be appreciated to those familiar with well known cathode follower action of electronic discharge tubes, during the period of conduction of both series discharge tubes, the cathode 70 of vacuum tube 68 will assume a potential corresponding to the potential instantaneously applied to the control grid 66 at the time of conduction. If the capacitor 72 is made sufficiently small in consideration of the conductor impedance of vacuum tube 68, it will be seen that the capacitor will be virtually fully charged, during the conduction time corresponding to the pulse duration to the potential value attained by cathode 70. Thus, it will be seen that the voltage appearing across capacitor 72 during the conduction time will correspond to the amplitude of the received signal during this period of keyed conduction. Immediately following this keyed period both tubes 68 and 70 are rendered non-conductive. Hence, for lack of a substantial discharge path the voltage of the capacitor 72 will maintain a virtually constant value until the next keyed interval at which time its terminal potential will again be altered in response to the actual signal amplitude applied to the control electrode 66 which in turn represents received signal strength.

Manifestly, the voltage appearing across capacitor 72 will vary as a direct function of signal strength and therefore will become more positive with an increase in signal strength. Consequently, the voltage across capacitor 72 may then be applied to the grid 82 of D. C. amplifier such as 84. The grid return resistor 86 connected with the grid 82 may be of a sufficiently high value to produce virtually no discharge voltage drop across the capacitor 72 during a line scansion interval.

The anode 88 of the vacuum tube 84 is then connected through load resistor 90 to a source of positive potential 92 so that the positive voltage at the terminal 94 will vary inversely with the received signal strength. The positive voltage at terminal 94 may then be transduced into a negative voltage suitable for application to the grids of the R. F. and I. F. amplifier stages in block 10 by a number of conventional circuit arrangements. The one shown here employs resistors 96 and 98 connected from anode 88 to a source of negative potential 100. The values of resistors 96 and 98 are shown proportioned to permit the negative voltage appearing at their juncture 102 to be suitable for application as a negative AGC potential. As shown, the D. C. amplifier 84 is provided with suitable operating bias by means of cathode resistor 104 in connection with a series resistor 106 connected with a positive potential source 108. The positive voltage developed across resistor 104 as a result of currents applied through resistor 106 may be such to bias the amplifier tube 84 to cut-off under no-signal operating conditions. In this way, the tube 84 may be made to supply the necessary threshold characteristic for the AGC system. It is clear that this threshold characteristic may also be achieved by suitable biasing of the vacuum tube 68 if desired.

As an example of AGC correction produced by the system shown in the figure consideration will be given to circuit conditions obtaining from an increase in signal strength. It will be assumed that the received signal 16 is of sufficient amplitude to cause development across capacitor 72 of a voltage in turn sufficiently positive to cause conduction and linear operation of the D. C. amplifier 84. An increase in signal strength will then cause the instantaneous potential of the control grid 66 of vacuum tube 68 to in turn be more positive during the action of keying pulse 64, in keying into conduction both vacuum tubes 66 and 74. Through cathode follower action capacitor 72 will then undergo an increase in positive terminal potential. The potential on grid 82 of D. C. amplifier 84 will also become more positive and produce a corresponding increase in the plate current through load resistor 90 which in turn will produce a drop in the positive potential appearing at terminal 94. Since the potential at 102 is already negative through the dropping action of the bleeder resistors 96 and 98, the voltage applied to the AGC terminal 11 will become more negative to decrease the gain of receiver 10 and tend to compensate for the increase in the received signal strength. The reverse action of course would accompany a decrease in signal strength. A decrease in signal strength will establish the grid 66 of vacuum tube 68 at a more negative potential during keyed conduction of tube 68 and 74 thus causing the capacitor 72 to undergo a drop in positive terminal voltage. This, in turn, produces a negative swing on the grid 82 of the D. C. amplifier 84 and causes the potential appearing at terminal 102 to become more positive. This increases the gain of the receiver in an effort to compensate for the decrease in signal strength.

As hereinbefore brought out, the inherently rapid action of this signal amplitude detection system comprising tube 68 and 74, which is the subject of the present invention, permits a practically instantaneous change in applied AGC terminal potential at the end of every line scansion interval corresponding in time to the occurrence of the keying pulses 64. Thus, the AGC system may easily correct for changes in received signal intensity on a line for line basis in the reproduced television image.

Another feature of the present invention resides in the fact that the AGC detection system requires virtually no power from the video signal source but derives its energy for developing the correcting potential from the horizontal deflection output stage. In this connection replacement of tube 68 by a pentode will provide more immunity to any changes in the amplitude of pulse 64. This latter consideration may be of particular importance where the horizontal deflection output stage is adapted to function as a pulse step-up high voltage power supply for the accelerating anode of the cathode ray reproducing tube 20. Under such conditions the pulse 64 may vary in amplitude in accordance with cathode ray beam current variations accompanying changes in D. C. picture background level. On the other hand under circuit conditions wherein the pulse amplitude 64 remains virtually constant in amplitude, it is apparent then that the duo-triode 74 and 68 may be combined into a single envelope to provide certain space economies in the practice of the invention.

In extremely high speed action of the circuit will automatically suggest other advantageous uses for it other than in AGC systems. For instance in systems where a certain periodically recurrent portion of the modulation envelope was varied in accordance with intelligence signal, it is conceivable that pulses similar to 64 could be synchronized to drive the tubes 68 and 74 into conduction during these periods and thus adapting the detector circuit as a demodulator for this signal intelligence.

From the foregoing, it is seen that the applicant has provided a simple, novel, compact, economical, and effective signal amplitude responsive detection system which is inherently versatile in its application to electronic equipment and finds particular application in a television high speed AGC system.

What is claimed is:

In a radio receiver adapted to receive signals of the television type, said signals having a recurrent synchronizing pulse component representing a fixed percentage of carrier modulation, an automatic gain control circuit for the radio receiver comprising, in combination, a source of timing signals extending in a positive direction and synchronous with said recurrent synchronizing pulse component, a first statically non-conductive electron discharge tube having an anode, a cathode, and a control electrode, a connection for applying said timing signals to the anode of said first electron discharge tube to render said tube periodically conductive, means for applying to the control electrode of said first electron discharge tube television signals whose recurrent synchronizing pulse component extends in a positive direction, a point of reference potential, a capacitor connected between the cathode of said first electron discharge tube and the point of reference potential, a second statically nonconductive electron discharge tube having an anode, a cathode, and a control electrode, a connection between the anode of the second electron discharge tube and the cathode of the first electron discharge tube, a connection between the cathode of the second electron discharge tube and the point of reference potential, a connection including a capacitor between said source of timing signals and the control electrode of the second electron discharge tube to render said tube periodically conductive, whereby the voltage developed across said capacitor is a function of the value of the television signal when said first discharge tube is rendered conductive, and means to vary the gain of said receiver in accordance with said voltage.

JACK AVINS.

REFERENCES CITED

The following references are of record in the file of this patent:

UNITED STATES PATENTS

| Number | Name | Date |
|---|---|---|
| 2,190,753 | Browne et al. | Feb. 20, 1940 |
| 2,197,900 | Schlesinger | Apr. 23, 1940 |
| 2,307,375 | Blumlein et al. | Jan. 5, 1943 |
| 2,323,885 | Wills | July 13, 1943 |
| 2,466,705 | Hoeppner | Apr. 12, 1949 |
| 2,467,486 | Krumhansl et al. | Apr. 19, 1949 |

FOREIGN PATENTS

| Number | Country | Date |
|---|---|---|
| 507,239 | Great Britain | June 6, 1939 |
| 512,109 | Great Britain | Aug. 29, 1939 |
| 845,897 | France | Sept. 4, 1939 |